United States Patent [19]

Langer et al.

[11] 4,214,906
[45] Jul. 29, 1980

[54] METHOD OF PRODUCING AN ARTICLE WHICH COMPRISES A FIRST ZONE OF A NONOXIDE CERAMIC MATERIAL AND A SECOND ZONE OF A SOFTER MATERIAL

[75] Inventors: Manfred Langer, Fallersleben; Johann Siebels, Wolfsburg, both of Fed. Rep. of Germany

[73] Assignee: Volkswagenwerk Aktiengesellschaft, Wolfsburg, Fed. Rep. of Germany

[21] Appl. No.: 635,399

[22] Filed: Nov. 26, 1975

[30] Foreign Application Priority Data

Nov. 29, 1974 [DE] Fed. Rep. of Germany ....... 2456453

[51] Int. Cl.² ............................................. F16H 13/00
[52] U.S. Cl. ............................. 75/208 R; 416/213 R; 416/241 B; 428/547
[58] Field of Search ............................ 416/241 B, 213; 75/208 R; 29/182.2, 156.8; 428/547, 548

[56] References Cited

U.S. PATENT DOCUMENTS

| 3,665,585 | 5/1972 | Dunn et al. ............................ 29/420 |
| 3,885,294 | 5/1975 | Chaundy et al. ....................... 29/420 |
| 3,892,030 | 7/1975 | De Pierre et al. ...................... 29/420 |
| 3,900,668 | 8/1975 | Olcott .................................. 428/297 |
| 3,905,723 | 9/1975 | Torti ................................... 416/241 |

OTHER PUBLICATIONS

Arrol, W. J., "The Sialons–Properties and Fabrication," Joseph Lucas Limited, 1973.
Die Tribaloy, ® Intermetallischen Materiale, Bulletin No. 1, The Dupont Company, Mar. 1973.
Popper, "Reaction Sintering with Special Reference to Non-Oxide Ceramics", International Ceramic Congress, Transactions, 1960.

Primary Examiner—Benjamin R. Padgett
Assistant Examiner—J. L. Barr
Attorney, Agent, or Firm—Brumbaugh, Graves, Donohue & Raymond

[57] ABSTRACT

The method produces an article which has a first zone comprising a nonoxide ceramic material (which materials cannot be soldered or welded) and a second zone comprising a different, softer material such as one which can be soldered or welded to other parts. A transition layer between the zones of the article comprises both materials for bonding the zones together. The method forms the article from powders with heat and pressure.

16 Claims, 4 Drawing Figures

METHOD OF PRODUCING AN ARTICLE WHICH COMPRISES A FIRST ZONE OF A NONOXIDE CERAMIC MATERIAL AND A SECOND ZONE OF A SOFTER MATERIAL

BACKGROUND OF THE INVENTION

The significance of the invention is most easily described in relation to a turbine for a gas turbine engine. In order to obtain a high specific capacity in a turbine jet power plant such as a gas turbine engine to render it competitive with conventional internal combustion engines, it is necessary to operate the turbine engine at a comparatively high gas temperature such as 1,350° C. At such temperatures it has been found undesirable to use metallic materials including those often called super-alloys for the turbines. Instead, techniques of turbine manufacture suggest the use of refractory (high-temperature resistant) ceramic material and, preferably, nonoxide ceramic materials such as those of the ceranox group which includes, particularly, $Si_3N_4$ and SiC. U.S. Pat. No. 3,905,723 discloses a ceramic turbine made entirely from this kind of material.

Although the ceramic materials described are desirable for forming turbines, it is difficult to fasten turbines or other articles made from these materials to other structures such as a metallic turbine shaft. Until now, connections of this type could be made only with great difficulty.

The low coefficient of thermal expansion of the ceramic materials is one advantage of their use for turbines. This advantage, however, becomes a disadvantage when faced with the problem of connecting the turbine to a shaft with a different coefficient of thermal expansion.

The hardness of brittleness of the ceramic materials present further problems of connecting articles made therefrom to other structures. Special treatments which present particular risk of damage of the ceramic article and are costly have been required. Welded or soldered joints between the ceramic material and the other structure cannot be made because the ceranox or other ceramic materials are not receptive to welding or soldering operations.

SUMMARY OF THE INVENTION

It is therefor an object of the invention to provide a method of producing an article which comprises, in a first zone, a nonoxide ceramic material and, in a second zone, a different, softer material such as one which can be soldered or welded to other structures.

It will be immediately understood from the object of the invention that the method is not limited to producing turbines nor are turbines the only articles which can be produced by the method. Rather, the method may be used to produce a variety of articles having the distinguishing two zones. Such articles are particularly useful when it is desired to weld or solder the one zone to another part.

In general, the method comprises molding the zoned article from appropriate materials in powdered form with at least pressure. A transistion layer forms between the zones where the powder for each zone mingles with the other in the mold. The transistion layer thus comprises at least the materials of both zones or compounds thereof and bonds the zones together.

The article produced by the method then comprises a first zone of a nonoxide ceramic material and a second zone of a different material such as one which can be soldered or welded to other parts. The resulting article thus has the properties of the ceramic material in the zone comprised of the ceramic material and the properties of the other material in the other zone. For example, a turbine can be made having a portion such as the blades with the desirable properties of ceranox monoxide ceramic material and a portion such as the hub with the desirable properties of being solderable or weldable to a metallic turbine shaft. Inasmuch as relatively simple welding or soldering operations can connect the turbine to the shaft, the risk of damage and the cost of special treatments for producing the turbine and shaft combination are avoided.

As later described in greater detail, there are two preferred forms of the method. In one, the materials for forming the zones of the article are charged into portions of a mold which correspond, respectively, to the zones of the article. The powdered materials are then heated and pressed in the mold to form the finished, solid article. Suitable temperatures for this form of the method are in a range from 1200° C. to 1850° C. with pressures of 50 to 1000 kg/cm$^2$ with 1600° C. to 1750° C. at 300 to 500 kg/cm$^2$ being preferred.

In the other practice of the method, the article is first cold pressed from powders with a powdered material for one zone which will form the desired ceramic material only after further treatment. For example, powdered silicon can be cold molded with the other material in portions of the mold corresponding to the zones of the article and then heated in a nitrating atmosphere for forming the desired nonoxide ceramic. Cold pressed is here defined merely as molding at a temperature low enough to avoid undesired chemical reactions of the materials, but not necessarily without any addition or generation of heat and specifically permitting bonding between the zones at the transition layer.

Both forms of the method may also include molding the article with a solution and then evaporating the solution and possibly other salts. This technique is sometimes called slip-casting.

At least certain nonoxide ceramic materials are known to give off a gas when they are heated to the temperatures desired for forming the article. It is therefore a preferred practice of the first form of the method (in which the materials are enclosed in a mold during heating) to select a material for the second zone which will react with the gas given off upon heating the ceramic material to form a solid compound. The heat-liberated gas then forms particles of a solid compound in the article rather than pores or bubbles of the gas which could more seriously weaken the article. In a related and also preferred form of this method, a small amount of another material or a different form of the material of the second zone may be introduced into the mold at the transition between the zones in the mold, the additional material or form of material being selected for combining with the materials of both zones and for reacting with the heat-liberated gas to form a solid compound therewith at, at least, the transition layer formed in the article.

Suitable nonoxide ceramic materials for the first zone of the article specifically include $Si_3N_4$, SiC, boron nitride, and Sialons, the later being a series of compounds resulting from the substitution of aluminum and oxygen in various degrees into a silicon nitride lattice. Suitable materials for the second, softer zone specifically include $Al_2O_3$, 52%Cu—35% Cr—13% Ni, 35% Cu—15% Cr—50% Ni, Co-Ni-Fe compounds (or those also including Mo), transition metals such as ferrous compounds, and transition metal compounds comprising a group of materials commercially available from the DuPont Company under the name Tribaloy and described in its Bulletin No. 1 dated March 1973. Suitable third materials, for forming a solid compound in the transition layer, specifically include Al, Mo and B.

DESCRIPTION OF THE DRAWINGS

Preferred forms of the invention, which are intended to illustrate but not to limit the invention, will now be described with reference, in part, to the drawings in which.

DESCRIPTION OF PREFERRED FORMS OF THE METHOD AND THE ARTICLES PRODUCED THEREBY

One Form of the Method

In one form of the method, a first portion of a mold corresponding to the first zone of the article to be made is charged with a nonoxide ceramic material in powdered form. Another portion of the mold corresponding to the second zone of the article is charged with $Al_2O_3$ which is also in powdered form. In charging the mold with the materials, a transition region forms where powder of both materials mingle. The transition region is, as a rule, very small with respect to the depths of the zones of the two materials even when, as later described, the zone with the $Al_2O_3$ (which can be soldered or welded) is also relatively narrow as compared to the nonoxide ceramic zone.

In an example in which the nonoxide ceramic material is $Si_3N_4$, it is additionally desirable to place a few particles of a material which will react with the components of the ceramic material (silicon or nitrogen) to form a solid compound therewith at the transition region. For example, particles of pure Al or B may be placed at the transition portion. Then, upon heating and pressing the contents of the mold to form the solid article therefrom, silicon or nitrogen gas liberated from the ceramic material by the heat will react with the Al or B to form a solid compound therewith rather than the pores or bubbles which the gas would have otherwise formed at the transition region.

With at least the powdered nonoxide ceramic material such as $Si_3N_4$ and the material which can be soldered or welded such as $Al_2O_3$ in the portions of the mold corresponding to the zones of the article to be produced, the powdered material is heated and pressed to form the solid article preferably at 1600° C. to 1750° C. at 300 to 500 kg/cm². A transition layer forms where the particles of the two powders mingle. For the materials mentioned, the transition layer will then comprise at least $Si_3N_4$-$Al_2O_3$, a sialon. Of course, if some particulate aluminum were also introduced at the transition portion, as described, and the heat of the molding process liberates only nitrogen from the $Si_3N_4$, the transition layer may also include some solid aluminum-nitrogen compounds.

An Article Produced by the Method

Figure 1:
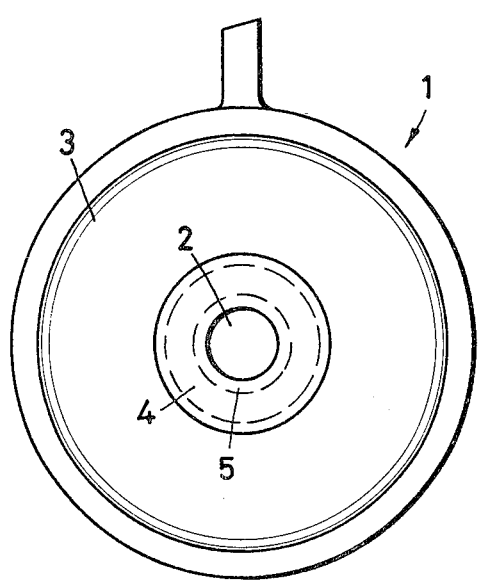
FIG. 1 is an elevation of an article (a turbine) made by one practice of the method.
Figure 2:
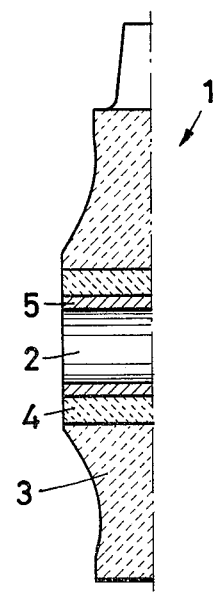
FIG. 2 is another view, partly in section, of the article shown in FIG. 1.

The article 1 (FIGS. 1-2) produced by the method just described then comprises an annular zone of practically pure $Si_3N_4$ 3 about the transition layer 4 and a zone of practically pure $Al_2O_3$ 5. For many articles, the zone 5 of the material which can be soldered or welded ($Al_2O_3$) may be relatively thin as compared to the zone of the ceramic material. The resulting article, for example a turbine, may thus comprise mostly the nonoxide ceramic material with a significantly smaller portion just large enough for welding or soldering of the other material ($Al_2O_3$).

The practice of the method just described is particularly suitable when the article produced by the method is to be soldered or welded to another part (shaft 2) close to the ceramic zone of the article and the ceramic material has the properties desired for the article except for fastening to other parts. Using a turbine, again, as an example, the previously described method is particularly suitable for forming a turbine comprising substantially the first, ceramic zone as an annular blade portion about a hub merely by welding or soldering attachment to the shaft and comprising the second zone at the inside of the hub. Sometimes, however, it is desired to produce an article having a more substantial second zone which can be soldered or welded to another part at some distance from the first ceramic zone. For example, it may be desired to produce a turbine having an integral shaft projecting therefrom, the shaft being the second zone of the article.

Another Article Produced by the Method

Figure 3:
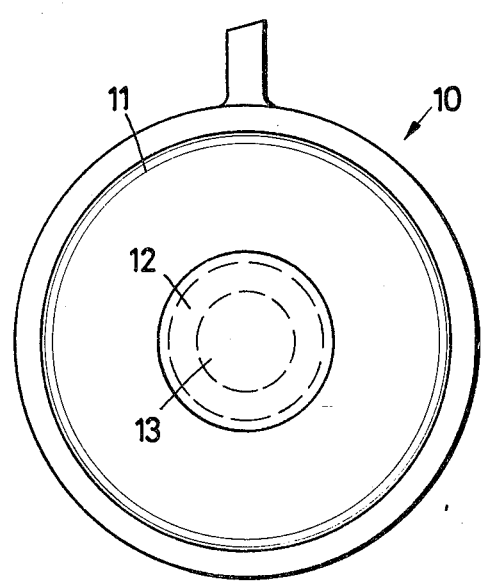
FIG. 3 is an elevation of another article (also a turbine) made by the method.
Figure 4:
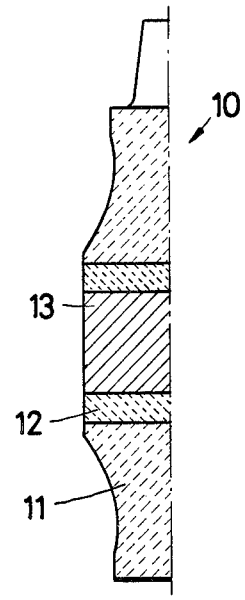
FIG. 4 is another view, partly in section, of the article shown in FIG. 3.

The method can also form an article 10 of the latter type as shown in FIGS. 3-4. For such an article, it would often and obviously be desired to have the second zone 13 formed of a metal of the transition group such as a ferrous metal or mixture of ferrous metals. The ferrous metals are then charged in powdered form into a portion of a mold corresponding to the second zone of the article and a nonoxide ceramic material 11 such as silicon or boron nitride is charged in powdered form into a portion of the mold corresponding to the annular first zone thereabout. A hot pressing processing is then applied as before described to form the finished solid article.

Preferred practice in producing an article having a substantial second zone also includes introducing a silicide or nitride former, for example Mo, into the transition region where the powders of the two materials mingle to form the transition layer 12 without gas bubbles.

Another Form of the Method

Still another practice of the method differs, not by the structure of the article produced by the method, but in the way the method is carried out. In the practice of this method, a powdered material which can form a nonoxide ceramic material when treated as by nitrating, for example Si, and powdered material for the second zone (and transition layer) are molded with pressure, but without sufficient heat to cause a chemical reaction in the materials. The first zone and the transition layer are then subjected to a nitrating atmosphere of, for example, $N_2$ or $NH_3$, while supplying heat (preferably 1200° to 1600° C.) and keeping the second zone covered or otherwise excluded from the nitrating atmosphere. The combination of the cold molding process and the subsequent nitrating then forms an article having a first zone of a nonoxide ceramic material and a second zone of a material which an be soldered or welded, with a transition layer therebetween.

When, however, SiC is used for the monoxide ceramic material, carburization in the way just described for nitrating Si would be difficult. It is therefore preferable in this form of the method to cold mold powdered SiC (with the powder for the second zone). The SiC and transition region are then sintered or heat treated under a buffer gas (non-oxidizing atmosphere) to produce a diffusion of grain interfaces in the powder. The resulting article then comprises a nonoxide ceramic (SiC) zone, a transition layer, and a second zone as before described.

Although the invention has heretofore been described with the material for the second zone as being a material capable of being soldered or welded, it will also be appreciated that the other material could also be merely sufficiently ductile (soft or non-brittle) to be amenable to other fastening means. For example, mechanical fasteners are well known for use with ductile materials such as the specifically mentioned ferrous compounds. For this purpose, a soft or ductile material is one which can be mechanically worked without significant difficulty as for mechanical fastening.

We claim:

1. A method of producing an article, such as a turbine blade including a first zone of nonoxide ceramic material and a second zone of a different material, which is softer than the nonoxide ceramic material, comprising the steps of introducing powders of a first material, which is at least capable of forming nonoxide ceramic material, and powders of a second material, which is different from and softer than the first material, into respective portions of a mold corresponding, respectively, to the first and second zones of the article; mingling powders of the first material with powders of the second material to form a transition region between the introduced powders of the first and second materials; and molding, by at least the common application of pressure, the introduced powders of the first and second materials, including the mingled powders, into a solid article having a first zone of a nonoxide ceramic material formed from the first material, a second zone of a different, softer material formed from the second material and a transition layer formed between the first and second zones from the mingled powders in the transition region for bonding the first zone to the second zone.

2. A method as in claim 1 wherein the first material is a nitride.

3. A method as set forth in claim 1 wherein the first material is selected from the group consisting of $Si_3N_4$, SiC, boron nitride, and sialons compounds.

4. A method as set forth in claim 1 wherein the second material is selected from the group consisting of $Al_2O_3$, 52%Cu—35%Cr—13%Ni, 35%Cu—15%Ni, Co-Ni-Fe Compounds, Co-Ni-Fe-Mo compounds, transition metals, and transition metal compounds.

5. A method as in claim 2 wherein the first material is a nonoxide ceramic material and the molding step is carried out by hot molding.

6. A method as set forth in claim 5 wherein the pressure of the hot molding step is in a range of from about 50 to about 1000 $kg/cm^2$ and the temperature of the hot molding step is in a range of from about 1200° C. to about 1850° C.

7. A method as set forth in claim 6 wherein the pressure is from 300 to 500 $kg/cm^2$ and the temperature from 1600° C. to 1750° C.

8. A method as set forth in claim 5 further comprising the step of introducing particles of a third material in the transition region, the third material being capable of forming a solid compound with a gas liberated from one of the other materials by the heat generated by the hot molding step and being selected from the group consisting of Al, Mo, and B, thereby substantially preventing the formation of gas bubbles which the gas would otherwise have formed in the transition layer.

9. A method as set forth in claim 5 wherein the second material forms a solid compound with a gas liberated from the nonoxide ceramic material by the heat generated by the hot molding step, thereby substantially preventing the formation of gas bubbles which the gas would otherwise have formed in the article.

10. A method as set forth in claim 5 wherein the nonoxide ceramic material is $Si_3N_4$ and the second material is a silicide or nitride former.

11. A method as set forth in claim 10 wherein the second material is $Al_2O_3$ which forms a sialon compound and nitrides at least in the transition layer with gases liberated from the $Si_3N_4$ by the heat.

12. A method as set forth in claim 1 wherein the molding step is carried out by cold molding and the first material is one which is capable of forming nonoxide ceramic material upon further treatment, the method further comprising the step of treating the first material and the mingled first and second materials with heat in a gas atmosphere, after they have been cold molded, to form the first zone of a nonoxide ceramic material and the transition layer.

13. A method as set forth in claim 12 wherein the first material is Si and the gas atmosphere is a nitrating atmosphere.

14. A method as set forth in claim 13 wherein the heat supplied during the treating step is at a temperature in a range of from about 1200° C. to about 1600° C.

15. A method as set forth in claim 12 wherein the first material is SiC and the gas atmosphere is a non-oxidizing atmosphere which is capable of producing, with the heat generated by the treating step, a diffusion of grain interfaces in the first material to form the first zone of a nonoxide ceramic material.

16. A method as set forth in claim 13 wherein the nitrating atmosphere is selected from the group consisting of $N_2$ and $NH_3$.

* * * * *

UNITED STATES PATENT AND TRADEMARK OFFICE
CERTIFICATE OF CORRECTION

PATENT NO. : 4,214,906
DATED : July 29, 1980
INVENTOR(S) : Langer et al.

It is certified that error appears in the above—identified patent and that said Letters Patent are hereby corrected as shown below:

Column 1, line 36, "hardness of" should read --hardness and--;
Column 1, line 39, "damage of" should read --damage to--;
Column 1, line 47, "therefor" should read --therefore--;
Column 2, line 65, "later" should read --latter--;
Column 5, line 5, "an" should read --can--;
Column 5, line 7, "monoxide" should read --nonoxide--;
Column 5, line 31, after "blade" insert a comma;
Column 5, line 57, "sialons" should read --sialon--;
Column 5, line 60, "15%Ni" should read --15%Cr - 50%Ni--;
and Column 6, line 3, "claim 2" should read --claim 1--.

Signed and Sealed this

Twenty-fifth Day of November 1980

[SEAL]

Attest:

SIDNEY A. DIAMOND

Attesting Officer

Commissioner of Patents and Trademarks